Aug. 27, 1963
N. R. HENRY
3,101,821
MOTOR CONTROL
Filed April 9, 1958
4 Sheets-Sheet 1
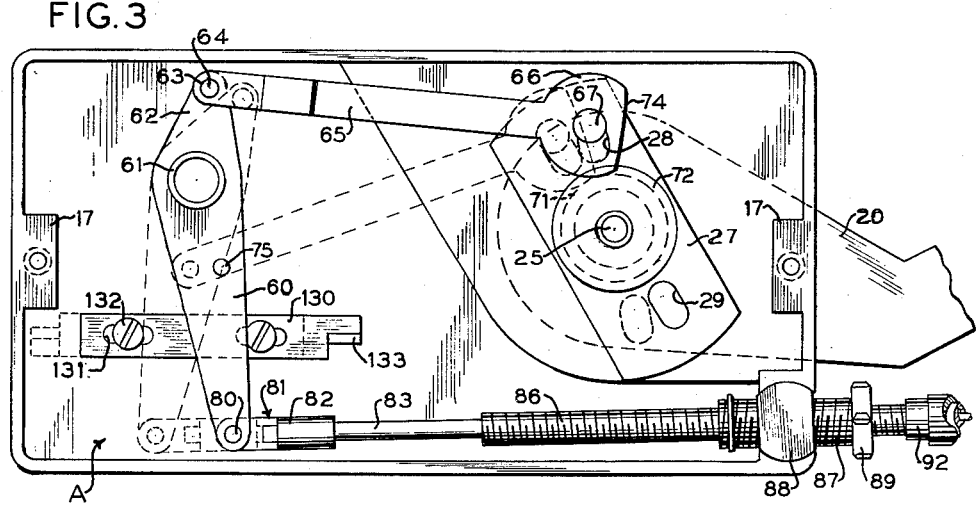
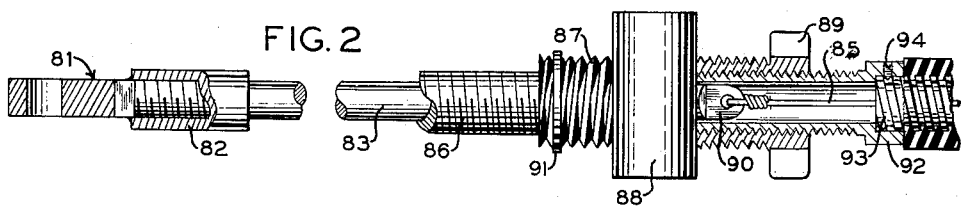
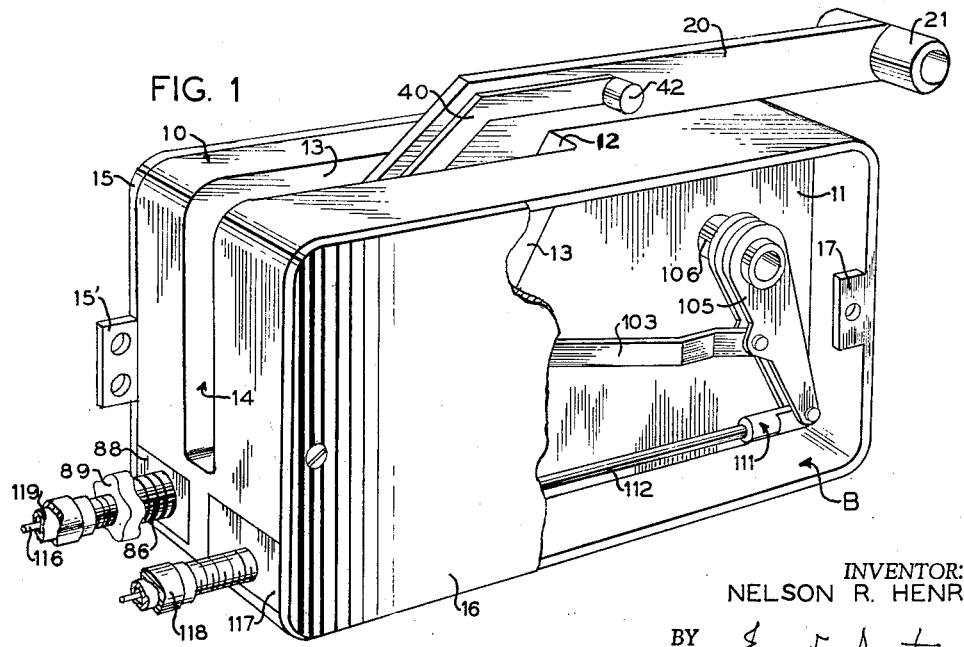
INVENTOR:
NELSON R. HENRY
BY
ATTORNEY Aug. 27, 1963

N. R. HENRY 3,101,821

MOTOR CONTROL

Filed April 9, 1958

INVENTOR:
NELSON R. HENRY

BY

ATTORNEY

Aug. 27, 1963  N. R. HENRY  3,101,821
MOTOR CONTROL

Filed April 9, 1958  4 Sheets-Sheet 3

INVENTOR:
NELSON R. HENRY

BY

ATTORNEY

Aug. 27, 1963  N. R. HENRY  3,101,821
MOTOR CONTROL

Filed April 9, 1958  4 Sheets-Sheet 4

INVENTOR:
NELSON R. HENRY
BY
ATTORNEY

United States Patent Office
3,101,821
Patented Aug. 27, 1963

3,101,821
MOTOR CONTROL
Nelson R. Henry, Decatur, Ga., assignor, by mesne assignments, to McCulloch Corporation, Los Angeles, Calif., a corporation of Wisconsin
Filed Apr. 9, 1958, Ser. No. 727,410
13 Claims. (Cl. 192—.096)

This invention relates to a motor control and is more particularly concerned with a single lever mechanism for controlling both the throttle and clutch of a prime mover.

In the past many motor controls have been developed which employ one or a plurality of juxtaposed levers for controlling the actuation of motors, engines or other such prime movers or transmission mechanism. These prior art devices have usually taken the form of separate levers which, through appropriate linkage controls, separately actuate the throttle and clutch of such prime movers. Because it is important that a clutch control or gear shift should not be operated when the shaft of a motor is rotating at high speed, usually some interlock mechanism between the two controls has been provided so that the clutch or gear shift control is rendered inoperative when the throttle is advanced.

The single lever controls of the prior art have usually taken the form of a mere combination of the throttle control and gear shift control whereby the actuation of the lever in a predetermined manner will operate the throttle and the actuation of the lever in another predetermined manner will operate the gear shift. Thus in the prior art it remains the prerogative of the operator whether the single lever shall be employed for throttle control or for gear shift.

Some single lever controls which provide for substantially simultaneous control of clutch and throttle have been developed; however, these devices have been complicated and have required the operator to apply a large amount of force to the lever to operate the same. Also, some of these single lever devices require rigid rods between the motor and the control.

While the present invention is adaptable to wide and varied application to control the various types of prime movers and power transmissions, the invention here disclosed has particular adaptability to the controlling of outboard motors for boats. Thus the embodiment disclosed will be discussed with reference to such outboard motors. In this particular field a practical motor control must be inexpensive and simply installed and operated. Further, since outboard motor boats are sometimes operated in restricted waterways such as in canals, dock slips and inlets, a motor control must be capable of indicating by feel or sight whether the gear shift is in a neutral or engaged position. Since a motor control usually remains on a boat throughout its useful life, the moving parts of the control should be protected, insofar as is possible, from the weather and from moisture. In salt water, corrosion of the elements of the motor control, if not protected, would be marked and, in many instances, would cause malfunctioning of the device or render the same inoperative. Resistance to shock and vibration is another desirable feature of a good motor control.

Briefly, to provide a single lever control for both the throttle and clutch incorporating the above described desirable features and others which will be described hereinafter, I have devised a mechanism which includes a compartmented casing provided with a pair of opposed substantially water tight chambers, one containing the gear shift or clutch control mechanism and the other containing the throttle control mechanism. The two mechanisms are linked to one lever disposed entirely without the casing, such linking being accomplished by shafts which pass through the inner spaced walls of the casing so that substantially no water is permitted to enter the chambers. My motor control is so constructed that when the lever is normal to the casing the throttle of, say, a remote outboard motor, is in its idling position and the throttle remains in its idling position even though the lever is advanced or withdrawn through a small arc. During this period of travel, shifting of the gears or clutch from neutral to forward, as well as from neutral to reverse, is accomplished. The remaining portion of the throw of the lever either forwardly or rearwardly advances the throttle.

As will be understood hereafter, my motor control is capable of being mounted either vertically or horizontally without changing the mechanism and may be mounted on either side of the boat. Furthermore, it may be utilized for advancing the throttle by either pushing or pulling the inner cable of a Bowden wire and the idling speed of the motor may be adjusted by rotation of an external nut.

Another feature of my invention which, while not essential to the proper operation thereof, is found desirable, is an interlock mechanism which prevents rapid shifting from forward to reverse.

It is therefore among the primary objects of the present invention to provide a novel, simple and improved motor control mechanism for the joint control of a plurality of motor instrumentalities by a single actuating mechanism.

More specifically, it is an object of the present invention to provide a motor control mechanism by which the throttle and clutch of a power unit may be jointly controlled through manipulation of a single lever.

It is further an object of the present invention to provide a control mechanism for outboard motors which provides, through the manipulation of a single manual lever, for automatically co-ordinating the adjustment of the throttle with the setting of the clutch between the motor shaft and the propeller.

A further object of the invention is to provide a device of the character described for the automatic reduction of throttle opening when the control is moved to change the clutch connection.

Another object of the invention is to provide overriding means in combination with a single lever clutch and speed control to permit direct throttle control irrespective of clutch position.

Another object of the invention is to provide for a joint throttle and clutch control including means limiting the throttle opening and consequent motor speed while the clutch is in reverse position.

It is also an object of the present invention to provide a mechanism of the character set forth which is substantially waterproof.

A further object is to provide a device of the character set forth which is adapted to mounting in a plurality of positions without interference with the operative function thereof so that the device may be universally applied to a plurality of boat designs and control installations.

Numerous other objects, features and advantages of the present invention will be apparent from consideration of the following specification taken in conjunction with the accompanying drawings, in which:

FIG. 1 is a perspective view of the present preferred embodiment of the invention.

FIG. 2 is a detailed sectional view showing the adjustable throttle control connection.

FIG. 3 is a side elevation of the throttle control side of the device with the cover plate removed and the control lever in reverse position.

Figure 4:
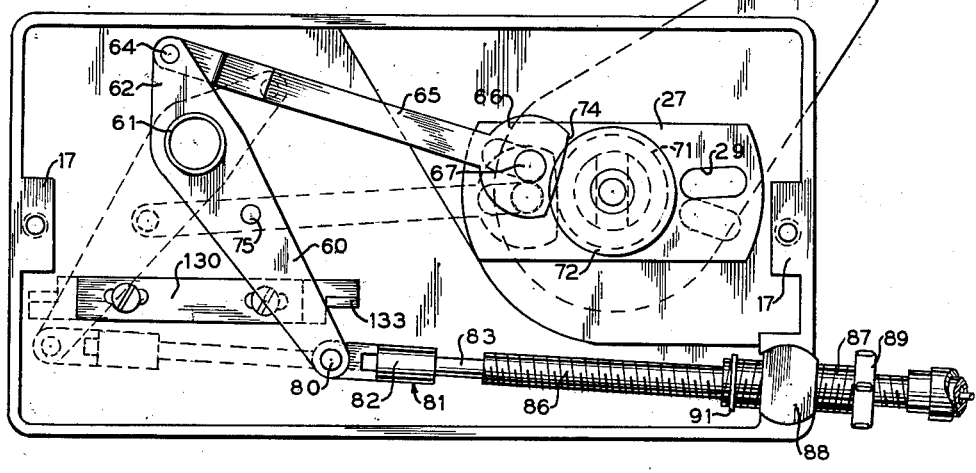
FIG. 4 is a view similar to FIG. 3 of the throttle side with the control lever in neutral position.

Referring now in detail to the embodiment chosen for purpose of illustrating the present invention, numeral 10 denotes the rectangular frame forming an outer peripheral wall of the casing which houses the throttle and clutch control mechanisms of my invention. A central vertically disposed partition 11 divides the casing into a throttle control compartment A and a gear shift or clutch control compartment B. The central portion of one corner of frame 10 is cut away and a flange 12, which is joined along its back surface to an edge provided at a corner of partition 11, extends from the end of the horizontal cut away portion to the end of the vertical cut away portion. A pair of spaced walls 13 extend from the edges of flange 12 to the edges of the cut away portion to define a generally triangular central guide channel 14 which is separated from compartments A and B. Any suitable cover plates, such as plates 15 and 16 may be employed for closing compartments A and B by securing the same to brackets 17 formed on the frame 10. Either of plates 15 or 16 may be provided with ears 15' by which the control housing is mounted to a boat.

Figure 7:
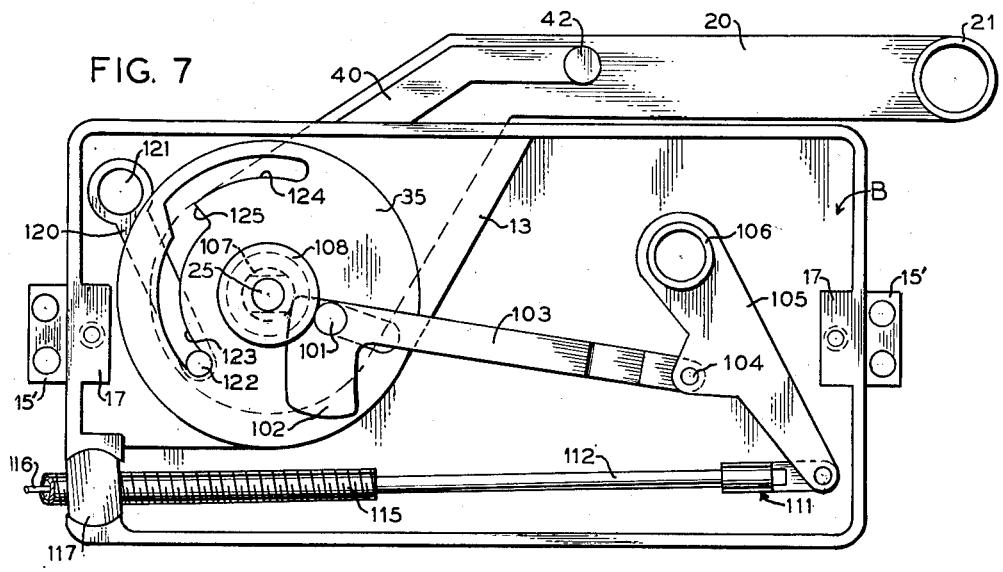
FIG. 7 is a view similar to FIG. 6 showing the control lever in forward position.
Figure 8:
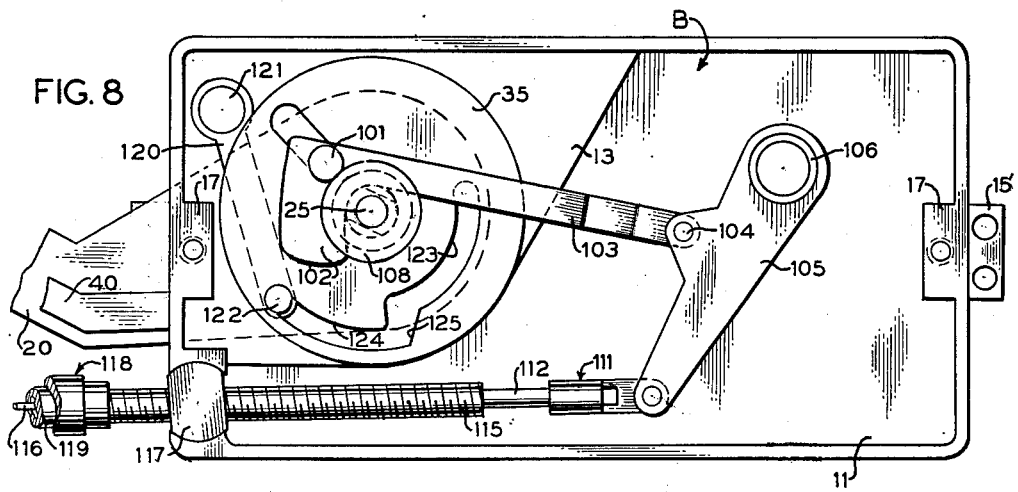
FIG. 8 is a view similar to FIGS. 6 and 7 with the control lever in reverse position.

Rotatably supported in guide channel 14 for movement in the plane of partition 11 is control lever 20 having a cross handle 21 adapted to be grasped by the operator. The lever 20 is in dog-leg form, having a straight outer portion angularly disposed with respect to an inner hub portion which is positioned in guide channel 14, the arrangement being such that the control lever is permitted a 150 degree movement in channel 14 to positions, for example, as shown in FIGS. 7 and 8. Thus it is seen that lever 20 may lie substantially flat along the upper surface of frame 10 with cross head 21 extending beyond frame 10 when lever 20 is in its most advanced forward position as shown in FIG. 1, and may be pivoted to its extreme rearward position as shown in FIG. 8.

Figure 9:
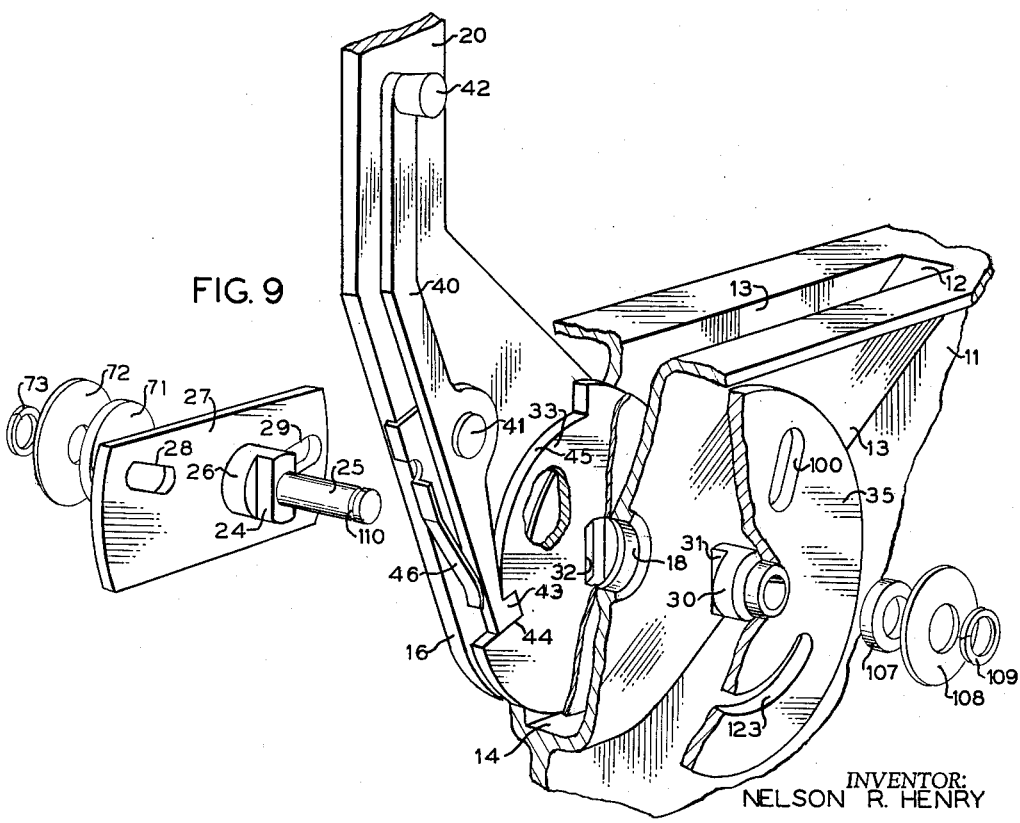
FIG. 9 is a fragmentary, exploded view illustrating details of the throttle and clutch control plate coupling arrangement.

Referring now momentarily to FIG. 9, it can be seen that the section walls 13 are formed with a pair of aligned round holes 18 which communicate compartments A and B with central channel 14. The hub 19 of lever 20 is formed with an elongate aperture so as to receive correspondingly shaped elongate shoulder 24 of the shaft 25 which is rotatably supported in aligned holes 18, the arrangement being such as to provide for fixed rotation of shaft 25 with lever 20. Adjacent shoulder 24 is provided circular bearing head 26 in throttle control compartment A. Each end of plate 27 is stamped to provide opposed and inclined throttle control slots 28 and 29 which extend radially with respect to shaft 25. Thus it will be seen that as lever 20 is rocked, shaft 25 moves therewith because of the engagement of elongate shoulder 24 in the hub 19 of lever 20, with the result that throttle control plate 27 moves in unison with lever 20.

Shaft 25 is further provided with hollow outer shaft or sleeve 30 having an elongate key projection 31 which is received within a registering elongate opening 32 of clutch coupling plate 33 carried on shaft 25 in channel 14 and free for rotation with respect to shaft 25. The outer end of the sleeve 30 projects into the clutch control compartment B to have mounted thereon the clutch control disc or plate 35 for rotation with plate 33.

To provide for the selective coupling of clutch control disc 35 to the control lever 20, a spring urged catch 40 is pivotally mounted as at 41 to one side of lever 20. The upper outer extremity of catch 40 is provided with knob 42 and at its opposite end with detent 43 adapted to be releasably received within recess 44 formed in a reduced peripheral edge 45 of the clutch coupling plate 33. Leaf spring 46 normally urges catch 40 in counterclockwise rotation to seat the detent 43 in recess 44. When the detent 43 is so engaged with the recess 44, the plate 33 will be pivotally moved with lever 20 and with shaft 25. However, should it be desired to control the throttle without movement of the clutch control mechanism, pressure on knob 42 will rotate catch 40 in clockwise direction against the tension of spring 46 to withdraw detent 43 from the recess 44 to permit limited movement of lever 20 in clockwise direction without corresponding movement of clutch coupling plate 33 and clutch control disc 35.

Figure 5:
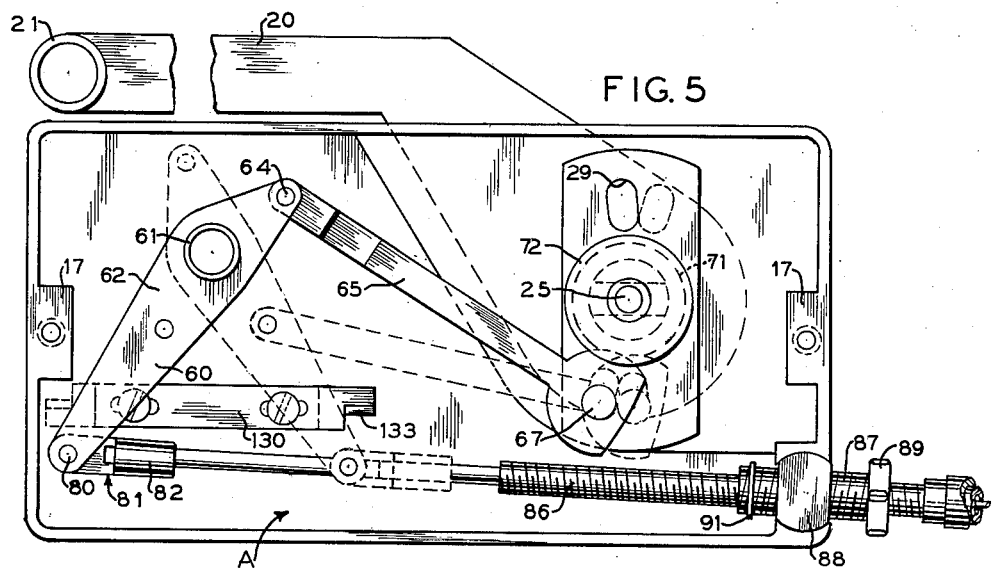
FIG. 5 is a view similar to FIGS. 3 and 4 with the control lever in forward position.

In throttle compartment A of the housing, as shown in FIGS. 3, 4 and 5, there is pivotally mounted a throttle control lever 60 journaled upon a transverse bearing 61 which is supported from partition 11. Lever 60 includes an upper free arm 62 apertured as at 63 to receive pin 64 of throttle control link 65. The opposite end of link 65 is formed with head 66 having a securing pin 67 that engages slot 28 in throttle control plate 27. In response to movement of lever 20, head 66 of control link 65 rides the periphery of circular cam spacer or disc 71, being aligned therewith by outer washer 72 of larger diameter, which is held in position by retaining ring 73 at the end of shaft 25, as shown more clearly in FIG. 9. The head 66 is formed with arcuate camming surface 74 having a radius taken at the center of pin 64, so that in neutral position of manual control lever 20, as shown in FIG. 4, the surface 74 of head 66 is disposed against the cam spacer 71 with pin 67 of link 65 positioned in the innermost radial end of slot 28.

From the foregoing construction it can be seen that during the first 30 degree movement of control lever 20 from its neutral position in either direction, the relation of camming surface 74 to spacer 71 is such that pin 67 of link 65 rides outwardly in radial slot 28 so as not to alter the position of throttle control lever 62. Upon completion of the "lost motion" of such 30 degree movement, however, the pin 67 reaches the end of slot 28, and spacer 71 reaches the end of camming surface 74 on head 66, so that further movement of manual lever 20 effects a commensurate movement of throttle control lever 60. In some installations of outboard motors, however, the movement of the control wire in one direction will increase the throttle opening, while in other forms such movement decreases the throttle opening. The present invention permits control in either instance by the provision of aperture 75 in lever 60 which may receive the pin 67 of the link 65, the arrangement being such that link 65 may be connected with the upper aperture 63 for a clockwise pivotal movement of lever 60. It is to be noted, however, that plate 27 should be reversed or rotated 180 degrees with respect to its engagement with lever 20 so as to secure pin 67 of link 65 in slot 29, rather than slot 28, when it is desired to secure the pin 64 of pin 65 in aperture 75 of lever 60 so as to effectively maintain the same relative movement of the lower end of the lever 60 in reverse direction.

Pin 80 is secured in the lower end of lever 62 for pivotal engagement with the eye coupling 81 which is formed with internally threaded base 82 to receive the threaded end of plunger 83. As shown most clearly in FIG. 2, plunger 83 is connected to inner Bowden wire 85 which is adapted to control the throttle opening of an outboard motor. To provide for the adjustment of the tension on inner cable or Bowden wire 85 with respect to the Bowden wire guide or outer cable 93, so as to control idling speed, the rod 83 passes slidably into the externally threaded sleeve 86, terminating in eyelet 90 therein to which inner Bowden wire 85 is connected. The sleeve 86 is externally threaded for engagement within the internally and oppositely threaded bushing 87, the latter also being externally threaded for selective positioning in the universal mounting member 88 which permits limited pivotal movement of bushing 87 in a vertical plane. External of the housing the bushing 87 is provided with star head 89, the arrangement being such that when head 89 is turned, the threading of bushing 87 and sleeve 86 is such as to alter the connected adjustments of the wire 85 along its length so as to increase or decrease the tension applied therefrom to the throttle. Outward threading of the bushing 87 is limited by the retaining ring 91. As shown, the sleeve 86 extends beyond the head 89 of the bushing 87 terminating in enlarged coupling 92 which secures Bowden wire guide or outer cable 93 therein as by retaining screw 94.

From the foregoing, it can be seen that the throttle of an outboard motor may be directly controlled through inner Bowden wire 85 in direct relation to the movement of the lever 20 and that the normal tension applied to the throttle mechanism may be adjusted through the oppositely threaded interconnecting mechanisms. It can further be seen that by a change in the connecting cam arrangement for link 65 the forward or reverse movement of lever 20 may be so arranged to provide for either clockwise or counterclockwise rotation of lever 60.

In considering this part of the present construction, it will be understood that the cover plates 15 and 16 enclose the throttle and clutch control compartments and that since control lever 20 is mounted between walls 13, both compartments A and B are sealed against moisture and foreign matter so as to protect the parts therein from deterioration.

Figure 6:
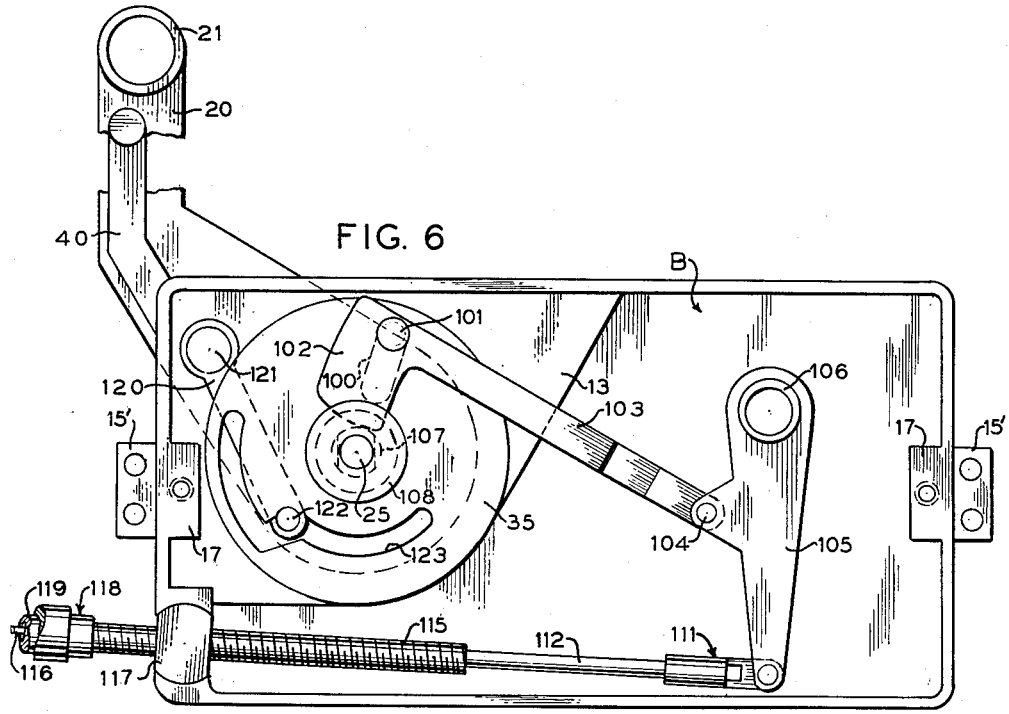
FIG. 6 is a side elevation of the gear shift side of the control mechanism with the cover plate removed and the control lever in neutral position.

In the compartment B, as shown in FIGS. 6, 7 and 8 of the drawings, clutch control disc 35 is provided with elongate radial slot 100 engageable by pin or stub shaft 101 carried by enlarged head 102 formed on the outer free end of shift link 103, the opposite end of which is pivotally connected as at 104 with shift lever 105 pivotally mounted on bearing 106 that is supported from partition 11. The periphery of enlarged head or finger 102 is utilized as a camming surface to ride the circular cam spacer or disc 107 on shaft 25, being aligned therewith by large outer washer 108 which is held in position by retaining ring 109 in groove 110 on the end of shaft 25, as shown in FIG. 9.

The lower end of shift lever 105 is provided with coupling connection 111, similar to coupling 81, 82, engaging clutch shift rod 112 which is disposed in sleeve 115 for connection to inner Bowden wire 116 in the same manner as throttle control rod 83 is connected. The sleeve 115 is threaded through universal mounting member 117 terminating in enlarged coupling 118 which is secured to Bowden wire guide 119. Since it is desirable to retain the gears in selected enmeshment against inadvertent displacement thereof, the arrangement is such that as control disc 35 is rotated in counterclockwise direction to that position shown in the FIG. 8, elongate radial slot 100 will permit link 103 to drop downwardly about its pivot 104, whereby head 102 will engage the far side of disc 107. Such movement will not have any effect on the position of shift lever 105, but will preclude inadvertent movement of the link 103. Similarly, when control disc 35 is rotated in clockwise direction to the position shown in FIG. 7, elongate slot 101 will be so rotated as to permit link 103 to drop, moving pin 101 to the innermost radial position in the slot, thus bringing the head downwardly alongside disc 107. Such disposition of head 102 precludes inadvertent rotation of lever 105 by which the gears might be inadvertently retracted from the engaged position to which they have been moved by Bowden wire 116 in response to the movement of lever 20.

It has already been noted that control disc 35 will rotate with the pivotal movement of lever 20 when latch 40 is in its normal position as urged by spring 46 with its detent 43 within recess 44. The arrangement also provides for release of movement of control disc 35 with lever 20 upon pressure being applied to knob 42 so that there may be a free manipulation of the throttle control lever without corresponding movement of the gears if so desired. In normal operation, however, the detent is engaged and coupling plate 30 will rotate coextensively with lever 20.

In the operation of devices of the present type, it is preferable to have some means to prevent rapid movement of the control lever from full forward through neutral position to reverse to permit the motor to slow down before reverse clutch engagement so as to avoid gear damage. For this purpose, there is provided within the compartment B a freely suspended rockable detainer lever 120 pivotally mounted at 121 and formed at its forward end with pin or stub shaft 122 received within a slot in control disc 35. The slot is provided with an arcuate portion indicated at 123 and an adjoining arcuate portion of greater radius indicated at 124, portions 123 and 124 being joined by a generally radial intermediate connecting portion 125. This arrangement is such that as clutch control disc 35 is rotated in counterclockwise direction from the position shown in FIG. 7 to the neutral position shown in FIG. 6, pin 122 will be latched by the wall of intermediate slot portion 125 so as to provide a temporary stop to retard the free pivotal movement of lever 20. After release of the rearward force on lever 20, however, pin 122 is free to drop by gravity from slot portion 123 to portion 124 and thereafter lever 20 is free to further rotate control plate 35 to cause a reversal of the gear relationship. It will be noted, however, that with slower movement of control lever 20 from forward to reverse, pin 122 falls by gravity into outer arcuate slot 124 without latching against the wall of slot 125, since the motor would then have sufficient time to slow down to permit safe gear transition.

In movement of lever 20 from reverse to forward position, it has been found that no retarding effect is necessary to permit motor slowdown since maximum throttle in reverse is only half that available in forward direction. In reverse to forward movement of lever 20, therefore, pin 122 rides from outer arcuate slot 124 to inner arcuate slot 123 freely and without retardation by the walls of intermediate radial slot 125 regardless of the rapidity of movement of lever 20.

Considering next the idling speed adjustment of my invention, it will be seen that such rotation of star head 89 as would move sleeve 86 inwardly, changes its position with respect to rod 83, the linkage relation being such that lever 60 is not free to pivot under a pushing force from rod 83 because the camming surface 74 of link 65 abuts the spacer 71. Since rod 83 connects directly to Bowden wire 85, and since 86 is secured to Bowden wire guide 93, relative adjustment of rod 83 in sleeve 86 effects a coextensive adjustment of Bowden wire 85 in its outer cable or guide 93 so as to control the idling speed of an associated motor. Rotation of star head 89 so as to move sleeve 86 outwardly, however, causes rod 83 to pull against the bottom of lever 60, resulting in movement thereof as permitted by the sliding of pin 67 of link 65 otuwardly in radial slot 28 of plate 27 so as to prevent relative adjustment of the Bowden wire 85 with respect to its guide 93. To permit such outward movement of sleeve 86 to effect idling speed adjustment, maximum counterclockwise rotation of lever 60 may be limited by finger 133 on stop plate 130, the arrangement being such that elongate stop plate apertures 131 provide for limited positioning of the stop plate 130 on mounting screws 132 which secure the stop plate to partition 11. In like manner, when link 65 is connected to lever 60 below pivotal bearing 61 so as to effect opposite rotation thereof, plate 130 should be reversed so as to again position finger 133 to abut the lower end of lever 60 to limit its extreme clockwise position, as shown by the broken lines, so as to permit idling adjustment. Such limiting mechanism does not interfere with the forward position of the throttle, however, as shown by the solid and broken line connecting arrangements of FIG. 5.

From the foregoing it can be seen that the single lever motor control of my invention is capable of being mounted on either side of the boat and facilitates stacking of controls where it is desired to use two or more motors. Furthermore, by reconnecting link 65 and reversing plate 27, the same movement of manual control lever 20 may provide an opposite movement on the throttle controlling Bowden wire so as to permit utilization of my invention with motors having either push action or pull action throttles. In addition, a simple external idling control is provided by rotation of star head 89 so that idling speed may be adjusted to suit different operating conditions.

The invention further provides for maintaining the throttle control lever 60 in idle position throughout a 30 degree range of movement of manual control lever 20 from its neutral upright position, during which time shifting of the clutch from neutral to either forward or reverse is effected. The remaining portion of the throw of lever 20 actuates throttle control lever 60, with approximately 60 degrees of throttle control available in the forward position, and 30 degrees of throttle control available in the reverse position. Such automatic response of the clutch to movement of manual control lever 20 may be prevented, as for starting procedures where part throttle is desired, merely by movement of catch 40 which decouples the clutch control linkages. After starting, return of lever 20 to neutral position automatically re-engages the clutch coupling for operation as above described. As a further feature, the linkage 120 prevents rapid movement of lever 20 in shifting of the clutch from engagement in forward direction to reverse by requiring a slight release of force against the control lever 20 when in neutral position so as to permit the motor to slow down, as has been found desirable in most applications.

In the practice of the invention, numerous changes and modifications will be apparent to those skilled in the art to which this invention most nearly appertains. For example, rather than sleeve 86 and bushing 87 being oppositely threaded, they may be provided with threads of different pitch to effect their relative movement, and slot engaging pins, such as pins 67 and 101, may be provided with rollers to reduce friction.

From the foregoing it will be apparent that I have provided a motor control which is well adapted to fulfill the aforestated objects of the invention. Moreover, whereas the invention has been disclosed in particularity to an embodiment which gives satisfactory results, it will be understood that additional embodiments and modifications thereof may be provided and the full use of equivalents may be resorted to without departing from the spirit or scope of the invention as defined in the appended claims.

I claim:

1. A motor control including a housing, separate clutch and throttle control compartments in spaced side by side relationship formed by said housing, clutch control elements and throttle control elements in said clutch and throttle compartments, respectively, a single control lever pivotally mounted in the space between said compartments and means extending from said lever into each of said compartments for the actuation of clutch and throttle control elements therein, said means acting successively to move said clutch control elements and said throttle control elements, means in said space between said compartments to disengage said clutch control elements from said lever to permit control of said throttle control elements independently of said clutch control elements, and means for limiting the actuation of said throttle control elements when said clutch control elements are in a predetermined position.

2. A single lever outboard motor control device including a housing, opposed substantially closed clutch and throttle compartments formed on opposite sides of said housing, a lever having forward, reverse and neutral positions pivotally mounted between said compartments, a plate in said throttle compartment fixed for movement with said lever, a throttle control arm linked to said plate for continuous movement toward throttle opening position in response to both forward and reverse movements of said lever beyond the neutral position, a second plate, said second plate in said clutch compartment, means for moving said second plate with said lever, and means responsive in the neutral position of said lever to movement of said second plate by said lever for actuating a clutch to forward and reverse position.

3. A single lever outboard motor control device including a housing, opposed clutch and throttle compartments formed on opposite sides of said housing, a lever having forward, reverse and neutral positions pivotally mounted between said compartments, a plate in said throttle compartment fixed for movement with said lever, a throttle control arm linked to said plate for continuous movement toward throttle opening position in response to both forward and reverse movements of said lever beyond the neutral position, a second plate, said second plate in said clutch compartment, selectively engageable means for moving said second plate with said lever and means responsive in the neutral position of said lever to movements of said second plate by said lever for actuating a clutch to forward and reverse position.

4. A single lever outboard motor control device including a housing, opposed clutch and throttle compartments formed on opposite sides of said housing, a lever having forward, reverse and neutral positions pivotally mounted between said compartments, a plate in said throttle compartment fixed for movement with said lever, a throttle control arm linked through a lost motion connection to said plate for movement toward throttle opening position in response to both forward and reverse movements of said lever beyond the neutral position, a second plate, said second plate in said clutch compartment, selectively engageable means for moving said second plate with said lever, and means responsive in the neutral position of said lever to movements of said second plate by said lever for actuating a clutch to forward and reverse position.

5. A single lever outboard motor control device including a housing, opposed clutch and throttle compartments formed on opposite sides of said housing, a lever pivotally mounted between said compartments, a plate in said throttle compartment fixed for movement with said lever, a throttle control arm linked through a lost motion connection to said plate for continuous movement toward throttle opening position in response to both forward and reverse movements of said lever, a second plate, said second plate in said clutch compartment, selectively engageable means for moving said second plate with said lever, means responsive to movements of said second plate by said lever for actuating a clutch to forward and reverse position, and stop means to limit movement of said throttle control arm.

6. In a motor control, a throttle control including a plate, a control shaft carrying said plate, a radial slot in said plate, a link arm, a stub shaft connected to said link arm, said stub shaft projecting through said slot, a disk positioned adjacent said plate on said stub shaft, said disk being aligned with a portion of said link arm, a camming surface on said link arm for riding against said disk, said camming surface including an arc partially circumscribing said stub shaft to maintain said stub shaft at a remote position in said slot when said link arm is in the region of being tangent to said control shaft, said camming surface also including an arc passing adjacent said stub shaft to permit said stub shaft to ride in said slot closer to said control shaft when said lever is about aligned with said control shaft.

7. In a motor control, a casing, a plate pivotally mounted with respect to said casing, means connected to said plate for controlling the shifting of gears in a motor, a lever pivotally mounted to said casing, said plate being provided with a pair of intersecting arcuate cam slots, the intersecting portions of said cam slots being at different radial positions to provide an abutment aligned with at least one of said cam slots, and means connected to said lever for riding in said cam slots to temporarily engage said abutment when said plate is pivoted and to prevent further pivoting until said lever has shifted by gravity from one cam slot to the other, said lever being supported at an angle from the horizontal by said means.

8. In a motor control for remotely controlling the throttle of a motor, a casing, a shaft pivotally carried by said casing, a plate carried by said shaft, a link arm pivotally and movably connected to said plate, and a disk mounted adjacent said plate and concentric with said shaft, there being provided an arcuate portion on the end of said link arm for engagement with said disk for spacing the pivoted portion of said link arm a predetermined distance from said shaft during movement of said shaft and for varying said distance in accordance with the arcuate position of said shaft.

9. In a motor control, a casing, a shaft carried by said casing, a plate fixed with respect to said shaft for pivoting therewith, a link arm pivotally and movably connected to said plate, a finger projecting from the pivotal connection of said link arm, said finger cooperating with shaft and being of such dimensions as to urge said pivotal connection away from said shaft when said link arm is so positioned with respect to said plate that said finger is between said shaft and said pivotal connection and to permit the pivotal connection of said link arm to be urged toward said shaft during other positions of said link arm with respect to said shaft.

10. In a motor control, a casing, a lever centrally of said casing, a lever shaft rotatable by said lever, said shaft projecting outwardly of said lever, a latch engaging plate rotatably mounted adjacent said lever, a latch carried by said lever and engageable with said latch engaging plate, a pair of control plates having radial slots, one of said control plates being rotatably connected to said shaft, the other of said control plates being rotatably connected to said latch engaging plate, link arms for said control plates, stub shafts connected to said link arms, said stub shafts riding respectively in said slots, there being provided camming surfaces on said link arms, and means engageable by each of said camming surfaces whereby said camming surfaces vary the radial distance between said lever shaft and said stub shafts in accordance with the radial positions of said control plates.

11. In a motor control, a casing having a central partition to divide said casing into substantially closed compartments, a pair of spaced walls defining said compartments and a space therebetween within said casing, a flange joining said walls to said partition, shaft means extending through aligned holes in said walls, throttle control elements connected to said shaft means within one compartment, clutch control elements connected to said shaft means with the other compartment, and at least one lever connected to said shaft means in the space between said walls, said shaft means including a pair of shafts, one controlling said throttle control elements and the other controlling said clutch control elements, a plate connected to the shaft controlling said clutch elements and a latch on said lever for selective engagement of said plate, said lever being secured to said shaft controlling said throttle.

12. A motor control comprising a casing, shaft means projecting through said casing, a lever for rotating said shaft means, a pair of plates connected to said shaft means for rotating therewith, a pair of link arms respectively pivotally and movably secured to said plates, one of said link arms controlling the actuation of the throttle of a motor, the other of said link arms controlling the actuation of the clutch thereof, said link arms each being provided with camming surfaces, means engageable by said camming surfaces for varying the distance between their pivotal connections and said shaft means during positioning of said shaft means, a second lever and a follower on said second lever, one of said plates being provided with interconnecting cam slots receiving said follower, the intersecting portions of said cam slots being at different radial positions to provide an abutment aligned with at least one of said cam slots.

13. A motor control comprising a casing, shaft means projecting through said casing, a lever for rotating said shaft means, a pair of plates connected to said shaft means for rotating therewith, a pair of link arms respectively pivotally and movably secured to said plates, one of said link arms controlling the actuation of the throttle of a motor, the other of said link arms controlling the actuation of the clutch thereof, said link arms each being provided with camming surfaces, means engageable by said camming surfaces for varying the distance between their pivotal connections and said shaft means during positioning of said shaft means, concentric inner and outer cables, the end of said inner cable being linked to one of said link arms, an externally threaded member connected to said outer cable, an internally and externally threaded bushing receiving said threaded member and threadably engaging said casing, the internal and external threads of said bushing being so constructed and arranged that rotation of said bushing will cause movement of said outer cable with respect to said casing.

References Cited in the file of this patent

UNITED STATES PATENTS

| 181,096 | Neer | Aug. 15, 1876 |
| 446,672 | Elliott | Feb. 17, 1891 |
| 1,580,877 | Barber | Apr. 13, 1926 |
| 1,586,136 | Winterborne | May 25, 1926 |
| 1,867,579 | Mandelick | July 19, 1932 |
| 2,226,591 | Swenson et al. | Dec. 31, 1940 |
| 2,246,169 | Ericson | June 17, 1941 |
| 2,321,780 | Tondeur | June 15, 1943 |
| 2,379,692 | Dodson | July 3, 1945 |
| 2,398,568 | Turtle et al. | Apr. 16, 1946 |
| 2,420,856 | Brill et al. | May 20, 1947 |
| 2,435,037 | Gardiner et al. | Jan. 27, 1948 |
| 2,444,273 | Stevens | June 29, 1948 |
| 2,534,729 | Panish | Dec. 19, 1950 |
| 2,584,055 | Smith | Jan. 29, 1952 |
| 2,588,649 | Morse | Mar. 11, 1952 |
| 2,613,547 | Stewart | Oct. 14, 1952 |
| 2,691,080 | Kellogg | Oct. 5, 1954 |
| 2,721,637 | Holbrook | Oct. 25, 1955 |
| 2,729,984 | Morse | Jan. 10, 1956 |
| 2,759,578 | Manzolillo | Aug. 21, 1956 |
| 2,771,168 | Panish | Nov. 20, 1956 |

FOREIGN PATENTS

| 477,942 | Italy | Feb. 10, 1953 |